Nov. 16, 1926.
R. P. MORSE
1,607,359
FOOT MEASURING MACHINE
Filed Feb. 16, 1923    2 Sheets-Sheet 2
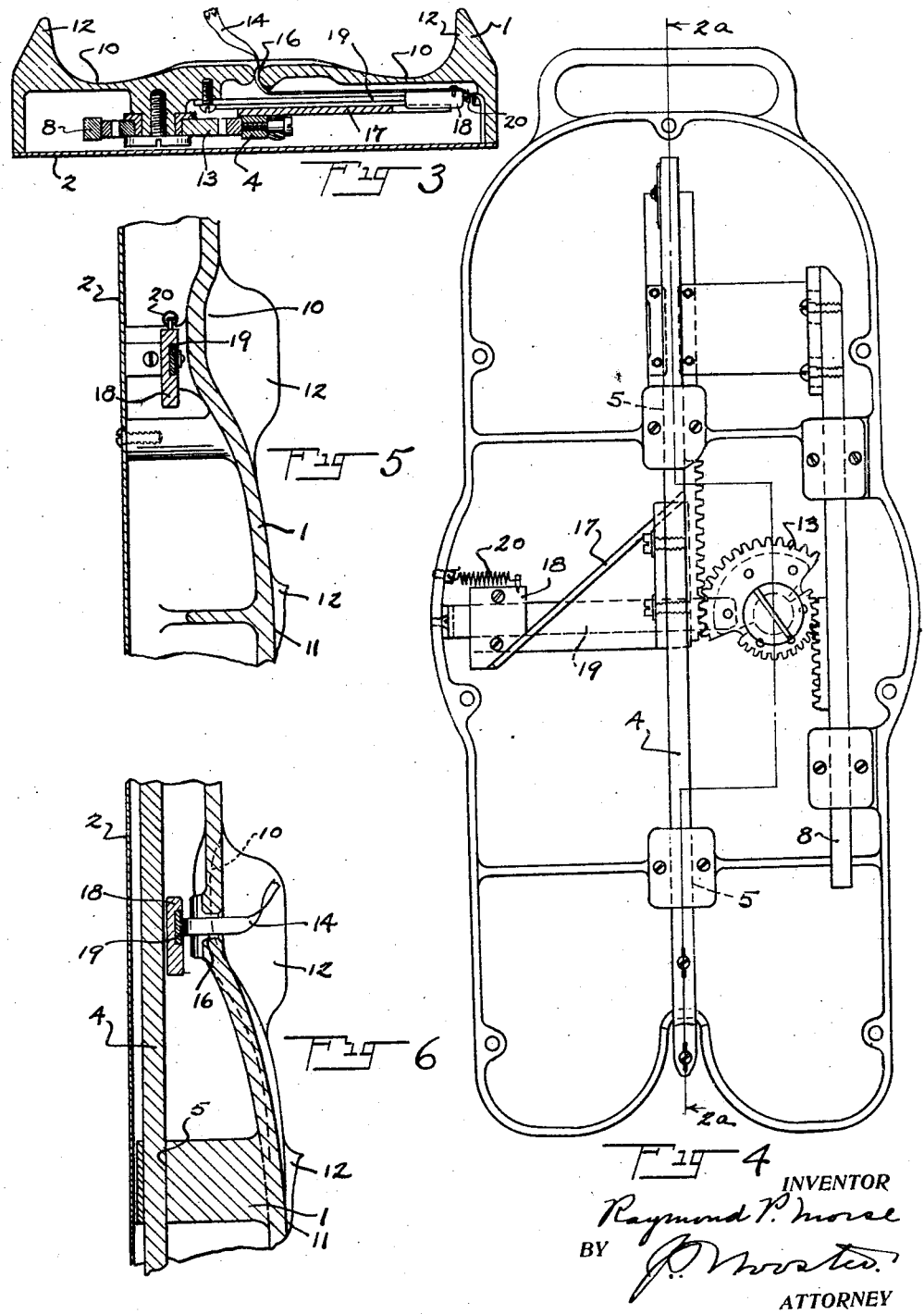
INVENTOR
Raymond P. Morse
BY
ATTORNEY Patented Nov. 16, 1926.

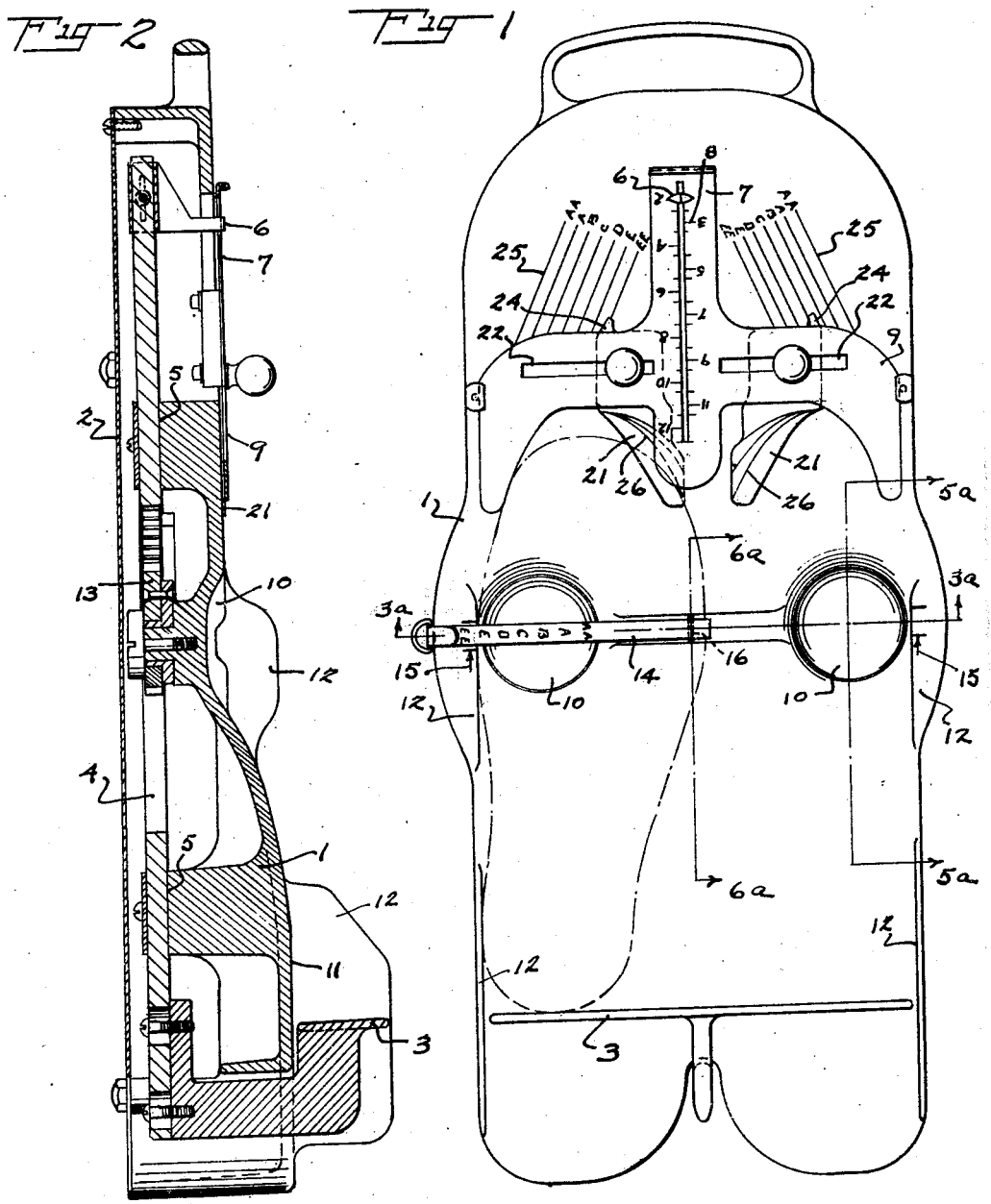

1,607,359

UNITED STATES PATENT OFFICE.

RAYMOND P. MORSE, OF SCARSDALE, NEW YORK, ASSIGNOR, BY MESNE ASSIGNMENTS, TO CANTILEVER CORPORATION, A CORPORATION OF NEW YORK.

FOOT-MEASURING MACHINE.

Application filed February 16, 1923. Serial No. 619,356.

This invention relates to shoe fitting devices and has for its object to provide a device for more accurately fitting shoes than devices at present available.

The common method of fitting a shoe is to use a length scale for determining the length size, the width being determined by trial, or by measuring the flat width of the foot. Such method is objectionable because of inaccuracy and by reason thereof the customer is frequently inclined to blame the maker of the shoe for unsatisfactory results. After extensive investigation, I have found that a better fit is obtained by determining the length size, and width as a function of the determined length. I have further found that the length size is best determined as a function of the length from the ball of the foot to the heel, and the width as a function of the foot circumference at the ball. This method is more accurate than the empirical method of measuring the flat width at a fixed, or proportionate distance from the heel. I have also found that indication of shape of toe of the proper shoe is also desirable.

I have devised a method and apparatus, one form of which is disclosed herein, whereby the foregoing objects are attained in a simple and accurate manner, but other apparatus can be devised without departing from the broad scope of the invention.

In its broadest form the invention comprises a method whereby after the length size of a foot is determined the width size appropriate for that length size is determined as a function of such length size. The method comprises a determination of the length of a foot from ball to heel with a proportionate addition thereto to give the overall length, or indicated size of the shoe, and the width being determined by the circumference at the ball of a foot as a function of the overall length. The apparatus for carrying out such method comprises a base plate adapted to receive the ball of the foot, having a movable heel gage slidable to contact with the heel and operating a toe gage moving over length size graduations, so that the length size can be directly read off when the heel gage is positioned against the heel of the foot. A tape graduated in width as functions of the foot circumference at the ball can now be wrapped around the foot and thereby the width size directly read for the ascertained length, the parts being so proportioned and graduated that the proper width for the ascertained length is definitely indicated. Inasmuch as a complete line of shoes will embody different toe outlines for each size, another gage is provided to indicate a suitable toe for the previously ascertained length and width.

Referring to the drawings:

Fig. 1 is a top plan view of my improved shoe fitting machine.

Fig. 2 is a section on the line $2^a$—$2^a$ of Fig. 4.

Fig. 3 is a section on the line $3^a$—$3^a$ of Fig. 1.

Fig. 4 is a bottom plan view with the lower plate removed.

Fig. 5 is a section on the line $5^a$—$5^a$ of Fig. 1 showing the raised portion under the arch.

Fig. 6 is a section on the line $6^a$—$6^a$ of Fig. 1.

1 is a base on which the foot rests while being measured and is preferably an aluminum casting for lightness in weight. 2 is a removable bottom plate protecting the mechanism contained within the base. 3 is a heel gage plate adjustably secured to the rod 4 by the screws and slots shown. Rod 4 slides on bearings 5 and is provided at its front end with a pointer 6 to indicate size lengths on scale 8. The base 1 is provided with side walls 12 along the sides of the raised portion 11 and adjacent each side of the platform is a rounded recess 10 depressed just enough to properly position the ball of the foot therein, with these recesses located as close to the outer edges of the platform as shown. In measuring the right foot, for example, this foot is placed as shown in Fig. 1 contiguous to the left wall 12 and with the ball resting in the left recess 10. Under the arch the platform is raised, and since the arch is usually higher on its inner side, the surface of the platform under the arch slopes inwardly slightly from each edge towards the center, as shown by Figures 2, 5 and 6. Each foot to be measured will extend over the slot 16 in the center of the platform through which the tape 14 is drawn for measuring the width of either foot as shown in Figures 1 and 3. This tape is preferably graduated in widths as functions of the circumference, that is, it reads the circumferential width, and means are provided for making these graduations correct for any length of shoe. A wedge 17 is fixed on the rod 4. Tape 14 is attached to slide 18 moving on rod 19. Slide 18 engages against wedge 17 when the tape is pulled around the foot to take the measurement of width, and the amount of tape thus released is dependent on the position of wedge 17, which moves in conjunction with rod 4 to which is attached heel plate 3. A spring 20 draws the slide 18 outwardly away from cooperation with the wedge 17 when not in use. After the heel plate has been moved contiguous the heel, the tape 14 is pulled out for measuring the periphery of the foot at the ball and is drawn out until the slide 18 engages the wedge 17, in which position the reading on the tape at some point of reference, such as the arrow 15, indicates the proper width of shoe for a foot of the measured length. Since a "C" width, for example, in a "7" shoe is wider than the same width in a smaller size, the tape is still enabled to give correct readings with the same graduations for any length of shoe because the wedge 17 permits the slide 18, or zero of the tape to be located at different positions for different lengths. The width indicated is thus a function of the length previously determined, with only one proper width indication for any determined length, whether the length be determined as a function of the ball to heel length, as preferred, or otherwise. The heel and toe plate carrying rods 4 and 8 respectively, are connected together for simultaneous movement by means of the gear 13 engaging racks on these two rods. Since the distance from the ball of the foot to the heel is about twice the distance from the ball to the toe, the heel plate should have substantially double the movement of the toe plate and for this reason the gear 13 is made in two parts as shown in Fig. 4. In order to save the trouble of making two sets of teeth having different pitch circles in the same blank these two sizes of teeth may be made in separate blanks riveted together as shown in Fig. 4 to form the gear 13. Any other form of proportional moving mechanism can be used instead of the gearing.

Carried by the toe plate 9 and transversely movable in the slot 22 is the slide 21 provided with a pointer 24 for cooperation with the scale 25 on the base to indicate predetermined widths already found for the measured length. The slide and toe plate are of thin material to indicate the toe outline without distorting the foot out of natural position. The toe shape indicating member 21 is moved so that its pointer 24 cooperates with the proper graduation 25 indicating the width previously ascertained by means of the tape 14. The side of the member 21 opposite the pointer is provided with a number of curved lines 26 thereon indicating the various shapes and styles of toe provided for each shoe of a predetermined length and width. With the pointers 24 properly set on the graduations 25, the member 21 will underlie the toes and a glance at the graduations 26 will indicate which shape of toe provides the necessary clearance for the particular foot being measured.

Since in properly fitting a shoe to the foot it is imperative that the ball of the foot take the position provided for it in the shoe, a particular merit of this invention consists in measuring the foot from heel to ball, and translating that measurement into the size or length of shoe to fit the foot properly from heel to ball. The toe plates show the length and toe room provided in shoe size called for by the size scale and thus provide the means to determine that ample toe room is provided in the size shoe called for by the scale reading. The lines 26 on the slide 21 when set at the indicated width enable a style toe to be determined which will not cramp the toes, leaving it optional to select a wider toe according to the lines 26 not covered by the foot. If the customer desires a narrower toe, the salesman can advise the customer that such desired toe would not be the most comfortable. The width is determined at the ball of the foot rather than at a certain fixed or proportionate distance from the heel, and the periphery of the foot at the ball is the safest indication of the width of shoe necessary for the widest part of the foot. While the supporting platform is of a width for each foot, the arrangement of the depressed ball receiving portion adjacent each outer edge whereby the right foot is placed on the left side of the platform and the left foot on the right side makes possible the design of this platform in compact size, less than twice the width of the smallest foot to be measured, and with a single tape. The provision of the scale carried on one of the movable end plates with the pointer carried by the other insures a maximum size to the scale graduations which are thus enabled to be larger than when the scale was dependent on relative movement between only one of the end plates and the platform.

By the foregoing method and apparatus, a decided advance in the art of fitting shoes is effected, since cut and try methods are eliminated and the customer can see for himself that a proper fit is being given.

This invention is an improvement upon the device shown in my pending application Serial No. 437,185 for shoe fitting device, filed January 14, 1921, and of which the present application is a continuation in part.

I claim:

1. In a device for fitting shoes, the combination with an elongated support on which the foot to be measured is to be placed, of an end plate movable lengthwise of the support, a transversely movable tape slide carrying a tape for indicating the width, and means connecting said slide and said end plate to simultaneously move both the end plate and slide to enable simultaneous adjustments for both length and width measurement.

2. A shoe fitting device comprising a support formed to receive and position the ball of the foot, a heel plate and a toe plate connected to move simultaneously to indicate the length of a foot positioned on said support, and means for determining the width of the foot.

3. A foot measuring device comprising an elongated support provided with separate means for measuring the length and width of each foot, said support being arranged to receive a right foot adjacent its left edge and a left foot adjacent its right edge and a width tape engaging said support adjacent its center and arranged to cooperate with either foot.

4. In a machine for fitting shoes, the combination with a support substantially double the width of a human foot, of walls at opposite edges of said support against either of which a foot may be placed, and a single tape extending from the support midway between said walls and adapted to measure the width of the foot placed against either wall.

5. In a shoe fitting device, means for positioning the ball of the foot, a heel gage, a gear connected to be actuated by said gage, a second gear carried by said first gear and of smaller diameter, and a toe gage connected to be moved by said second gear at a less rate than said heel gage.

Signed at Brooklyn, in the county of Kings and State of New York, this 31st day of January, 1923.

RAYMOND P. MORSE.